US008953790B2

(12) United States Patent
Qi et al.

(10) Patent No.: US 8,953,790 B2
(45) Date of Patent: Feb. 10, 2015

(54) SECURE GENERATION OF A DEVICE ROOT KEY IN THE FIELD

(75) Inventors: Zheng Qi, Milpitas, CA (US); Mark Buer, Payson, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/523,801

(22) Filed: Jun. 14, 2012

(65) Prior Publication Data

US 2013/0129087 A1     May 23, 2013

Related U.S. Application Data

(60) Provisional application No. 61/562,050, filed on Nov. 21, 2011.

(51) Int. Cl.
| | |
|---|---|
| H04L 9/22 | (2006.01) |
| G06F 21/60 | (2013.01) |
| H04L 9/32 | (2006.01) |
| H04L 9/08 | (2006.01) |
| H04K 1/00 | (2006.01) |

(52) U.S. Cl.
CPC ............ *G06F 21/602* (2013.01); *H04L 9/3247* (2013.01); *H04L 9/3263* (2013.01); *H04L 9/0869* (2013.01); *G06F 2221/0755* (2013.01)
USPC ............................... 380/44; 713/171; 713/175

(58) Field of Classification Search
USPC ....................................... 380/44; 713/171, 175
See application file for complete search history.

(56) References Cited

U.S. PATENT DOCUMENTS

| | | | | |
|---|---|---|---|---|
| 4,634,808 | A  * | 1/1987 | Moerder | 380/29 |
| 6,148,400 | A  * | 11/2000 | Arnold | 713/168 |
| 6,895,504 | B1 * | 5/2005 | Zhang et al. | 713/175 |
| 7,203,835 | B2 * | 4/2007 | Multerer et al. | 713/168 |
| 7,352,867 | B2 * | 4/2008 | Medvinsky | 380/278 |
| 7,788,483 | B1 * | 8/2010 | Falik et al. | 713/155 |
| 7,917,760 | B2 * | 3/2011 | McKeon et al. | 713/172 |
| 8,165,303 | B1 * | 4/2012 | Steele et al. | 380/277 |
| 2003/0138105 | A1 * | 7/2003 | Challener et al. | 380/277 |

(Continued)

FOREIGN PATENT DOCUMENTS

| | | |
|---|---|---|
| TW | 200737889 A | 10/2007 |
| WO | WO 2011/114197 A1 | 9/2011 |

OTHER PUBLICATIONS

TPM, TCG. "Main part 1 design principles specification version 1.2." 2011).*

(Continued)

*Primary Examiner* — Michael Simitoski
(74) *Attorney, Agent, or Firm* — Sterne, Kessler, Goldstein & Fox PLLC

(57) ABSTRACT

Methods and systems for secure key generation are provided. In embodiments, during the manufacturing process, a device generates a primary seed for the device and stores the seed within the device. The device exports the device primary key to a secure manufacturer server. The secure manufacturer server generates a public/private root key for the device and requests a certificate for the public root key of the device from a certificate authority. The device, having the stored primary seed, is integrated into an end-user system. Upon occurrence of a condition, the device after integration into the end-user system generates the public/private root key in the field. The system also receives and installs the certificate for the public root key.

21 Claims, 7 Drawing Sheets

(56) References Cited

U.S. PATENT DOCUMENTS

| | | | |
|---|---|---|---|
| 2004/0039924 A1* | 2/2004 | Baldwin et al. | 713/189 |
| 2005/0132182 A1* | 6/2005 | Challener et al. | 713/150 |
| 2005/0149733 A1* | 7/2005 | Catherman et al. | 713/175 |
| 2005/0166051 A1* | 7/2005 | Buer | 713/173 |
| 2006/0072762 A1* | 4/2006 | Buer | 380/277 |
| 2007/0095927 A1* | 5/2007 | Pesonen | 235/492 |
| 2008/0013721 A1 | 1/2008 | Hwang | |
| 2008/0072039 A1* | 3/2008 | Relyea | 713/158 |
| 2009/0083539 A1* | 3/2009 | Catherman et al. | 713/156 |
| 2010/0095120 A1* | 4/2010 | Thom et al. | 713/170 |
| 2010/0268943 A1* | 10/2010 | Roy-Chowdhury et al. | 713/156 |
| 2011/0099367 A1* | 4/2011 | Thom et al. | 713/156 |
| 2012/0079279 A1* | 3/2012 | Leclercq | 713/187 |
| 2012/0084806 A1* | 4/2012 | Fahrny et al. | 725/31 |
| 2012/0198514 A1* | 8/2012 | McCune et al. | 726/1 |
| 2012/0321085 A1* | 12/2012 | Belenky | 380/277 |
| 2013/0080764 A1* | 3/2013 | Khosravi et al. | 713/150 |

OTHER PUBLICATIONS

Taiwanese Office Action directed toward related TW Application No. 101140959, dated Aug. 6, 2014; 7 pages.

\* cited by examiner

SECURE GENERATION OF A DEVICE ROOT KEY IN THE FIELD

CROSS REFERENCE TO RELATED APPLICATIONS

This application claims the benefit of U.S. Provisional Patent Application No. 61/562,050, filed on Nov. 21, 2011, entitled, "Secure Key Generation" which is incorporated herein by reference in its entirety.

FIELD OF THE INVENTION

This application relates generally to data communication security and more specifically to cryptographic key management.

BACKGROUND

Computer systems are increasingly targets of a wide variety of security threats. Many computer architectures integrate a device having security sub-module or a separate stand alone secure processor to provide hardware support for applications. This security sub-module or secure processor often becomes the security foundation of the entire system. In these systems, it is desirable for the device to possess a device-unique root key. Often, the device-specific root key is an asymmetric key having a private key portion and a public key portion.

The public portion of the device-unique root key can be certified by a certificate authority (CA) through a certificate. A certificate binds the public portion of the device-unique root key using a digital signature of a trusted party (the CA) to an entity such as an individual or corporation. Typically, the digital signature is a hash of at least the device public key encrypted with the private key of the CA. By presenting the certificate of the device root key, a system integrating the device is able to establish a high level of trust to its peers or to a network hierarchy. Directly or indirectly, a device root key can be used to establish the authenticity of the system, to attest system status information, or to secure two-way communication.

Generating a device root key and issuing a certificate for the device root key to the system incorporating the device presents huge challenges to the device manufacturing process, both logistically and technically. The generation of RSA root keys is extremely time consuming and therefore not feasible for high volume production. Additionally, if keys are instead injected into the device, assurance in security evaluations requires secure communications between the equipment injecting the keys and the devices.

What is therefore needed are systems and methods for securely generating device root keys in the field and issuing device root key certificates.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

System for Secure Key Generation

An end-user system, such as a mobile device, computer, or other electronic appliance, integrates devices from multiple manufacturers. For example, a mobile handset may include, among other components, a baseband processor, a transceiver, a GPS receiver, and/or a Bluetooth device. The necessary devices for the system are provided to a system manufacturer, commonly referred to as an original equipment manufacturer, by the various device manufacturers for assembly of the end-user system.

Figure 1:
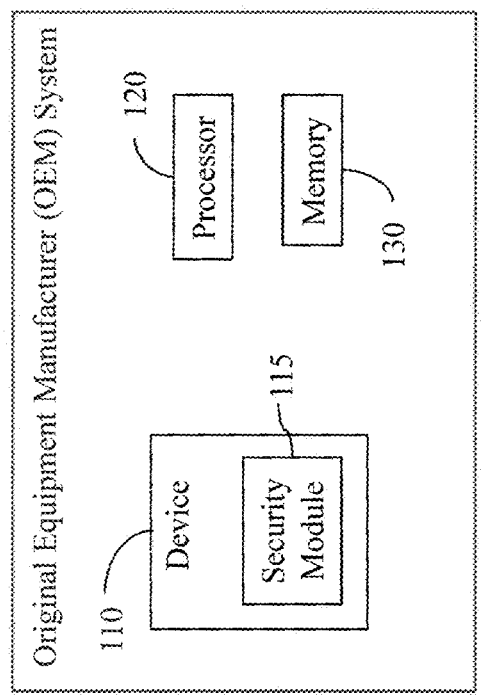
FIG. 1 is a high-level block diagram of a system incorporating embodiments of the present invention.

FIG. 1 is a high-level block diagram of a system 100 incorporating embodiments of the present invention. System 100 may be any type of electronic appliance including, but not limited to, a desktop computer, a wireless computer, a server, a router, wireless handset or any other form of electronic device. System 100 may be created by an original equipment manufacturer (OEM). At a high level, system 100 includes a device 110, a processor 120, and a memory 130.

In embodiments, device 110 may be manufactured by a different manufacturer then the original equipment manufacturer. In embodiments, device 110 includes a security module 115. Security module 115 provides hardware support for security applications. In alternative embodiments, device 110 may be a stand-alone secure processor such as a universal security hub (USH). Device 110 possesses a root cryptographic key (referred to herein as a "device root key"). A root key for the device is a master key that can be used for multiple purposes including, but not limited to, generating additional keys.

Root keys for devices such as device 110 may be statistically unique to each device and must he bound to the device. In order to ensure bonding, a device root key is either generated on the device or generated externally and securely injected into the device. After the device is deployed, the device root key is stored either in the non-volatile memory of device 110 or in external non-volatile memory (e.g., memory 130) that is cryptographically bound to the device.

Device root keys are typically long-term keys that may not be revocable. Because the device root keys are utilized to establish trust with other parties, the device root keys must be sufficiently cryptographically strong and well-protected. Asymmetrical keys, based on public key cryptography, are strongly preferred because the secret (private) keys are not shared among peers.

A device root key may be certified by a certificate authority (CA). During the certification process, the CA generates a certificate for the device root key. The certificate binds the public key portion of the device root key with an identity (e.g., the manufacturer of the device). The certificate includes, among other elements, the device root key (e.g., public device root key), an identification of the manufacturer of the device, an identification of the CA, and a digital signature for the CA. The digital signature for the CA is obtained by hashing the information in the certificate and encrypting the hashed information with the private key of the CA. By presenting a certificate for the device root key, additional trust can be developed with other parties in a network environment.

Significant challenges exist for creating device root keys and corresponding root key certificates. For example, creating device root keys during manufacture increases the cost of the manufacture process. In high volume device manufacture processes, the cost of a device is determined by the material cost (e.g., wafer, mask, package costs) as well as the processing cost. A major contributor to processing cost is the processing time spent on each device.

Ideally, the device root key should be generated by the device based on an on-chip random entropy source and other cryptographic functions with a test program in the manufacturing process. This process ensures that the private portion of the device root key is only known to the device and never leaves the device. However, when the device root key is an RSA key, generation of the RSA key by the device presents challenges.

Currently, RSA is the predominant algorithm supported by security applications. Therefore, the majority of device root keys are RSA keys. RSA security is derived from the difficulty of factoring large numbers. To generate the RSA public/private key pairs, two random large prime numbers, p and q, are first selected. The selection of p and q is based on the Miller-Rabin algorithm using a seed produced by the on-chip entropy source. For a 2048-bit RSA key, the two prime numbers are 1024-bits each. The prime number selection algorithm is extremely time-consuming. The duration of the process varies significantly from approximately 15 seconds to over a minute. If the RSA root key were to be generated by the device during the manufacturing process, the cost of the device would increase significantly due to the increased processing time introduced by the prime number selection process. In addition, the non-deterministic nature of the computation makes it difficult to set up the test program for high volume production.

Additionally, devices such as device 110, have limited on-chip memory. An RSA private key is represented by the quintuplet {p, q, dp, dq, qinv} for private key operations using Chinese remainder theorem. For a 2048-bit RSA device key, each parameter is 1024-bit. If the RSA key is generated on-chip, the private key must be safely stored and bound to the device. In a first approach, device 110 has sufficient non-volatile memory on-chip to allow the RSA private key to be programmed into the device non-volatile memory after it is generated. In a second approach, the RSA private key is encrypted with a device unique symmetrical key (e.g., 256-bit AES key) and exported. In this approach, the device unique symmetrical key must be programmed into programmable non-volatile memory within the device.

For devices manufactured using advanced CMOS digital process, on-chip re-programmable non-volatile memory technology, such as embedded flash, is not available. Using one-time programmable (OTP) non-volatile memory to store such a large key would increase the die size significantly. Furthermore, OTP storage makes it impossible to revoke and re-establish the root key for certain application. Therefore, the first approach is not viable for devices manufactured using these advanced CMOS digital processes.

The second approach, however, suffers from logistical challenges. For example, when the second approach is applied in the device manufacturing process, the encrypted private key and its corresponding public key must be collected and inventoried into a database. The encrypted private key must be subsequently injected back into the device by the original equipment manufacturer (OEM) of system 100. Alternatively, the encrypted key could be injected into the device in the field once an externally attached flash is available. As described in further detail below, injection of the root key in the field presents security challenges.

Figure 2:
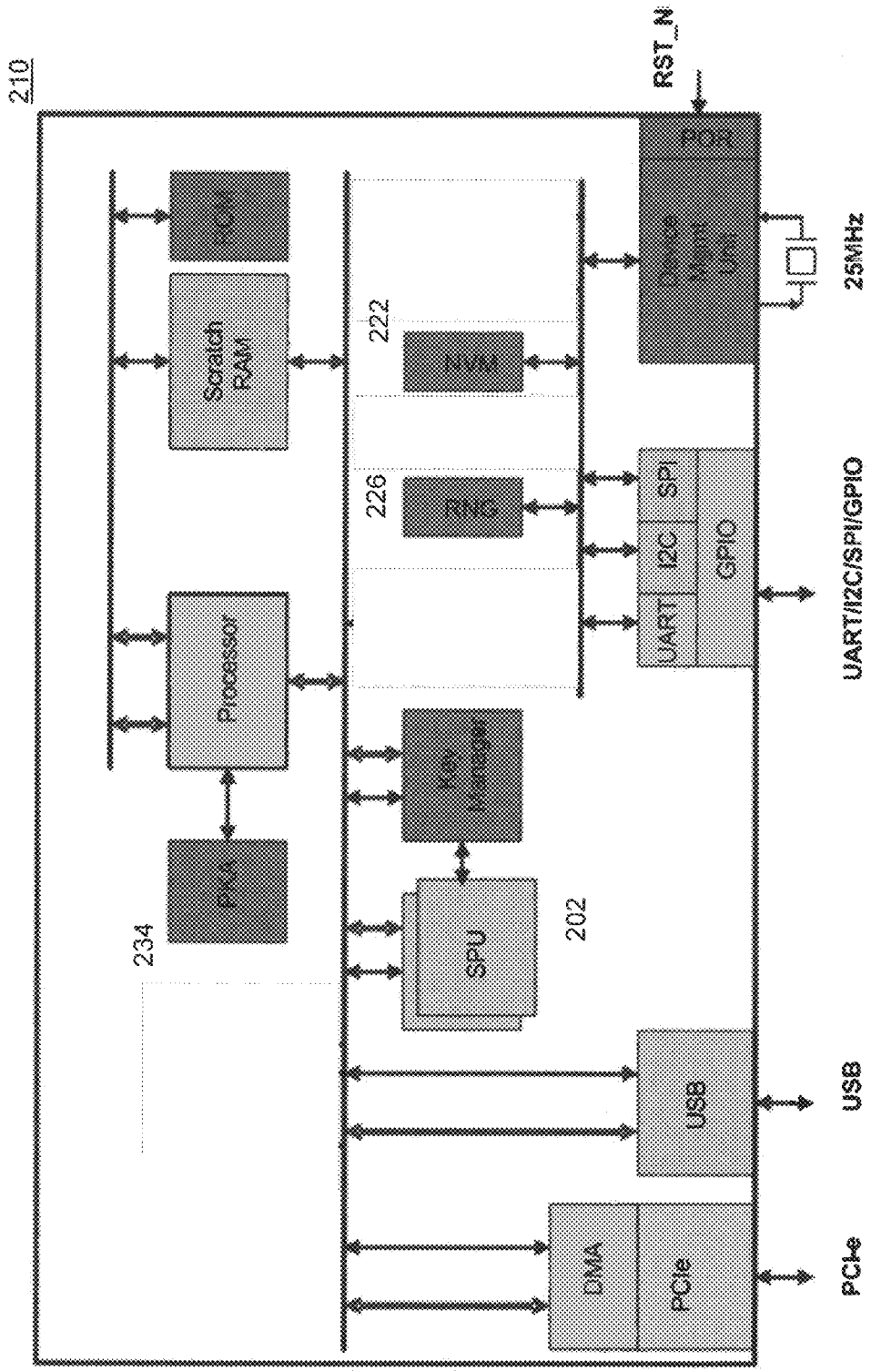
FIG. 2 is a block diagram of an exemplary security module according to an embodiment of the invention.

FIG. 2 is a block diagram of an exemplary security module 210 according to an embodiment of the invention. Security module 210 includes one or more security processing units 202, random number generator 226, a public key accelerator 234, and non-volatile memory 222, Random number generator 226 is configured to generate random numbers. For example, in embodiments described herein, random number generator 226 is configured to generate a random number as a seed for generating an RSA public/private key pair. Public key accelerator (PKA) 234 is configured to handle processing specific to supported public key operations. For example, public key accelerator may be configured to generate the RSA public/private root key.

Security module 210 (or secure processor) may also include components that enable the security module (or secure processor) to communicate with external devices. These components may include a Direct Memory Access (DMA) engine, a Peripheral Component Interconnect (PCI) interface, a general purpose interface, a Universal Serial Bus (USB) interface and/or one or more buses. The security module 210 may further include additional or alternate elements as required by specific embodiments such as a key manager 204, security protection logic, and RAM.

Figure 3:
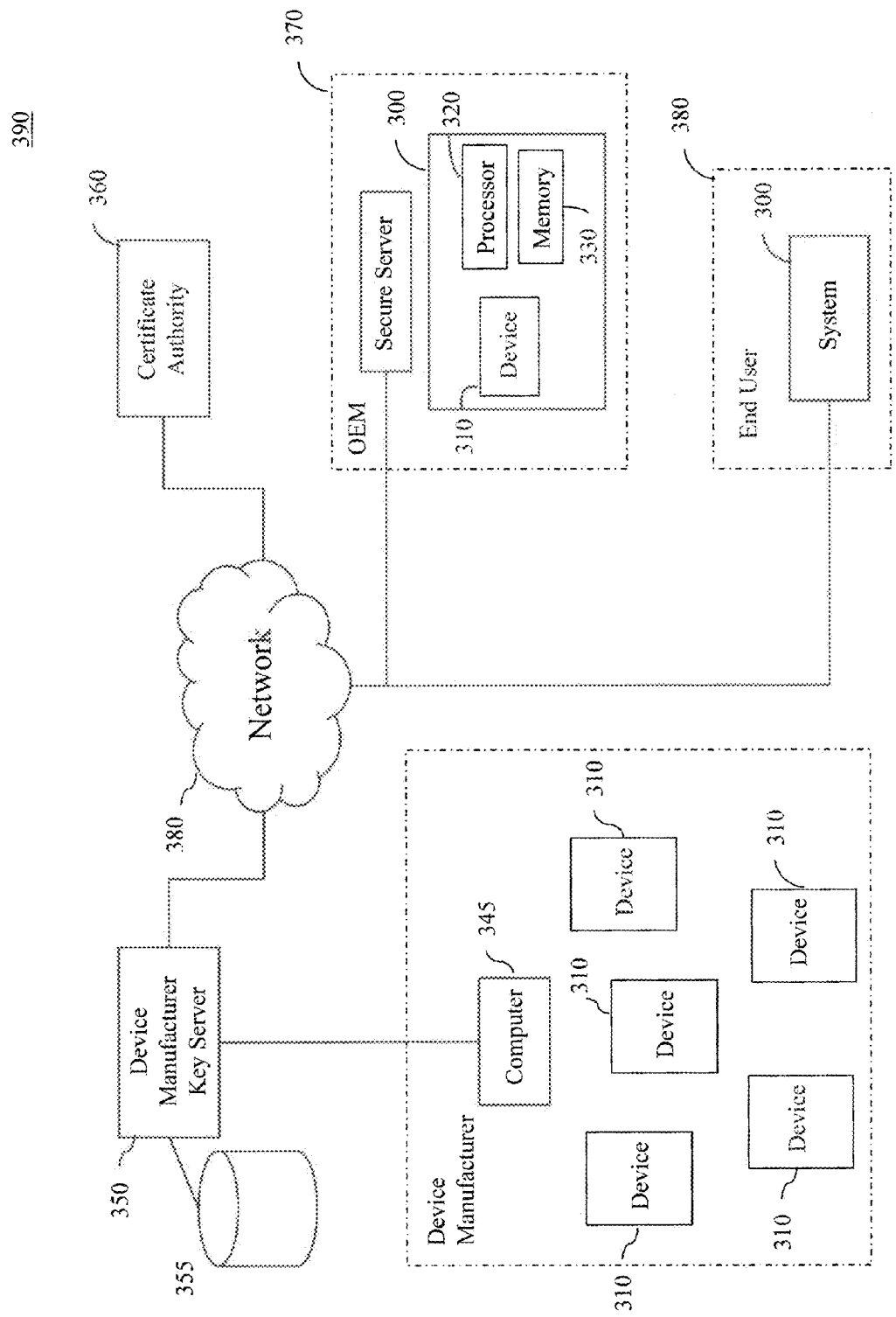
FIG. 3 depicts an exemplary operating environment integrating embodiments of the present invention.

FIG. 3 depicts an exemplary operating environment 390 integrating embodiments of the present invention. Environment 399 includes a device manufacturer, an original equipment manufacturer (OEM), a certificate authority, and a user. A device manufacturer has a device manufacturer facility 340, an optional key server 350, and a key management database 355. In an embodiment, the key server 250 and database 355 are not located in the device manufacturer facility. Manufacturer facility 340 manufactures devices 310. As described above, each device 310 has an associated device root key. Manufacturer facility 340 further includes one or more computers 345 configured to communicate with a manufacturer key server 350. Manufacturer key server 350 is responsible for managing keys and certificates for manufacturer devices 310. Manufacturer key server 350 is a secure server, In embodiments, manufacturer key server 350 includes a hardware security module (HSM)

Exemplary environment 390 may further include a certificate authority 360. Certificate authority 360 is configured to certify manufacturer device public keys and to generate certificates for the device public keys. In an embodiment, certificate authority 360 is operated by a third party. In alternate embodiments, certificate authority 360 may be provided or hosted by the manufacturer. Environment 390 also includes an original equipment manufacturer (OEM) facility 370 and an end-user facility 380 OEM facility 370 assembles components including at least one device into an end user system 300. The elements of FIG. 3 may be coupled together by network 380. Network 380 may be one or more public data communications networks such as the Internet, one or more private data communications networks, or a combination of both public and private data communications networks.

Methods for Secure Key Generation

Figure 4:
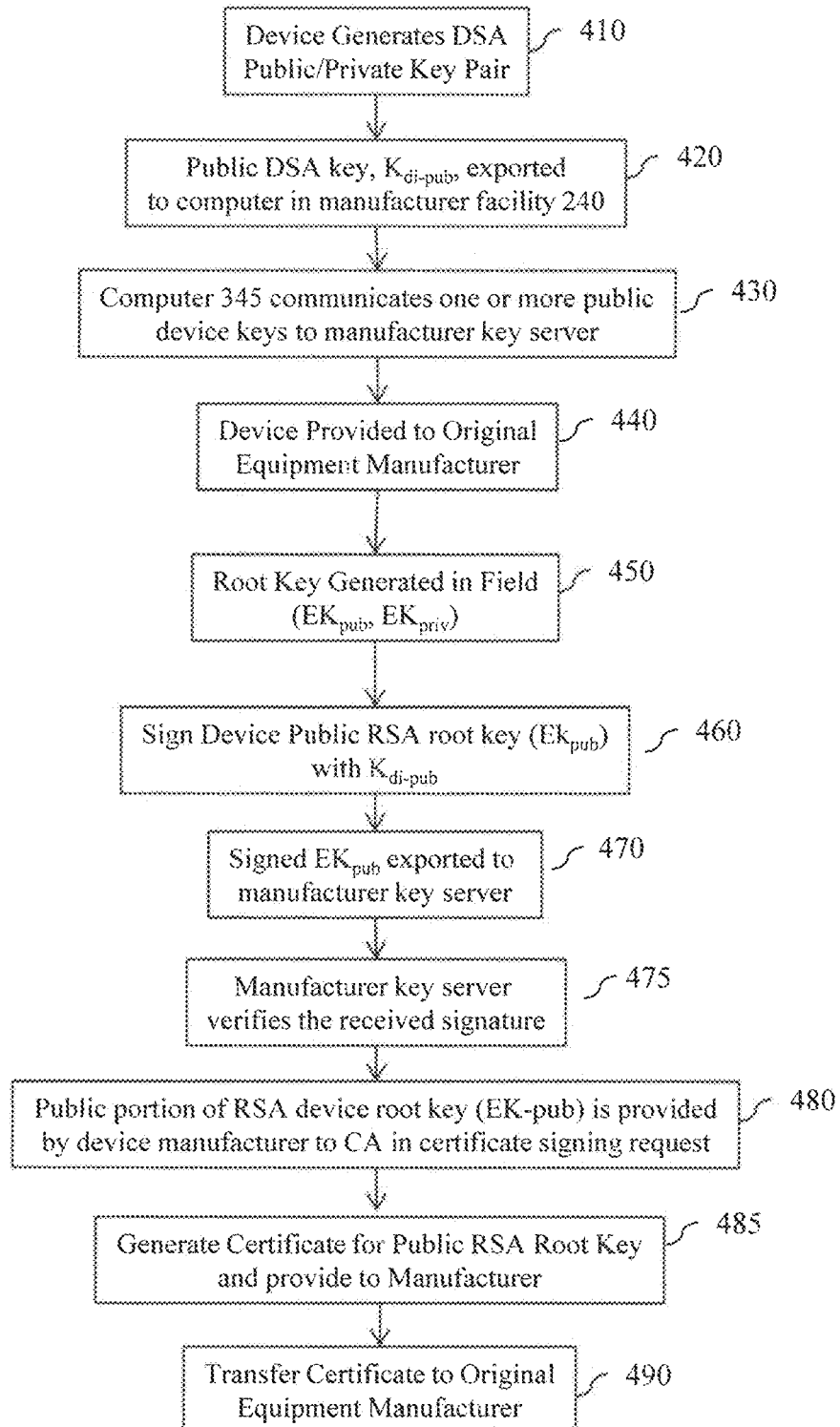
FIG. 4 depicts a flowchart of a method for on-demand field generation of device root keys, according to embodiments of the present invention.

FIG. 4 depicts a flowchart 400 of a method for on-demand field generation of device root keys, according to embodiments of the present invention. FIG. 4 is described with reference to the exemplary operating environment of FIG. 3. However, FIG. 4 is not limited to that embodiment.

In step 410, a device 310 generates a device public/private key pair using an algorithm such as DSA or elliptical curve DSA (ECDSA). For ease of discussion, the DSA keys are referred to herein as Kdi-pub for the public key portion and Kdi-priv for the private key portion. The private DSA device key is stored in memory within the device.

In step 420, the public DSA device key, Kdi-pub, is exported to computer 345 in manufacturer facility 340. Computer 345 receives a public DSA device key from a plurality of devices 310 manufactured at manufacturer facility 340.

In step 430, computer 345 communicates one or more public DSA device keys to the manufacturer key server 350. Each DSA public device key, Kdi-pub, communicated to the manufacturer key server 350 is associated with an identifier for the device. Manufacturer key server 350 stores the Kdi-pub for the device 310. For example, the kdi-pub may be stored in a manufacturer key management database 355.

In step 440, a device 310 is provided to an OEM for integration into a computer system 300. The OEM may then provide the assembled computer system to an end user (e.g., end user 380).

In step 450, a device RSA root key is generated on-demand in the field. The device RSA root key may be generated when the system boots up for the first time, when the security module/secure processor is initially accessed, or when a request for RSA root key generation is received. The device root key may be generated at an ORM facility or alternatively at an end user facility. For ease of discussion, the public/private device RSA root key is referred to as EK-pub (for the public key portion) and EK-priv (for the private key portion.

In step 460, the device 310 signs the public RSA device root key, EK-pub, using the private DSA key, Kdi-priv, stored in memory of device 310.

In step 470, the signed public RSA device root key is communicated to the manufacturer key server 350. The signed public device RSA root key may also be communicated with information identifying the device 310.

In step 475, manufacturer key server 350 verifies the received signature using the stored public DSA key, Kdi-pub. If the signature is verified, operation proceeds to step 480.

In step 480, the public portion of the RSA device root key (EK-pub) is provided by the device manufacturer to CA 360 in a certificate signing request.

In step 485, certificate authority 360 generates a device certificate including the public RSA device root key and provides the certificate to manufacturer key server 350. As described above, the certificate is digitally signed by the certificate authority 360.

In step 490, the device certificate is provided to OEM or the end-user. The OEM or end-user can then use the certificate to authenticate the device to third parties.

The method of FIG. 4 requires a certificate issuing mechanism to be established by the device manufacturer to allow end users or the OEM to make requests for certificates. For devices produced in high volumes, this may be costly to set-up and maintain. Additionally, the end-user would need to have sufficient technically savvy to request and install the certificate. Many end users lack this sophistication. Therefore, additional support may be required for the method of FIG. 4.

Figure 5:
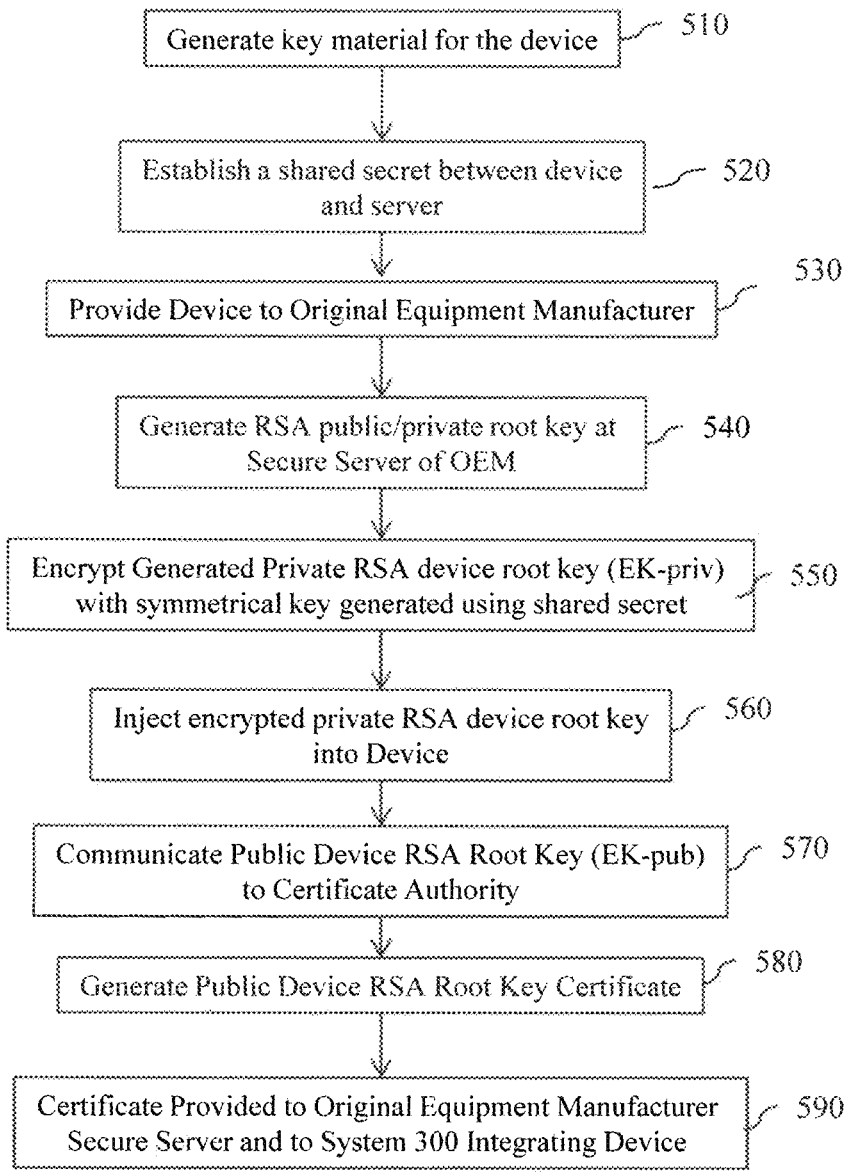
FIG. 5 depicts a flowchart of a method for injection of device root keys into the device by the OEM, according to embodiments of the present invention.
Figure 6:
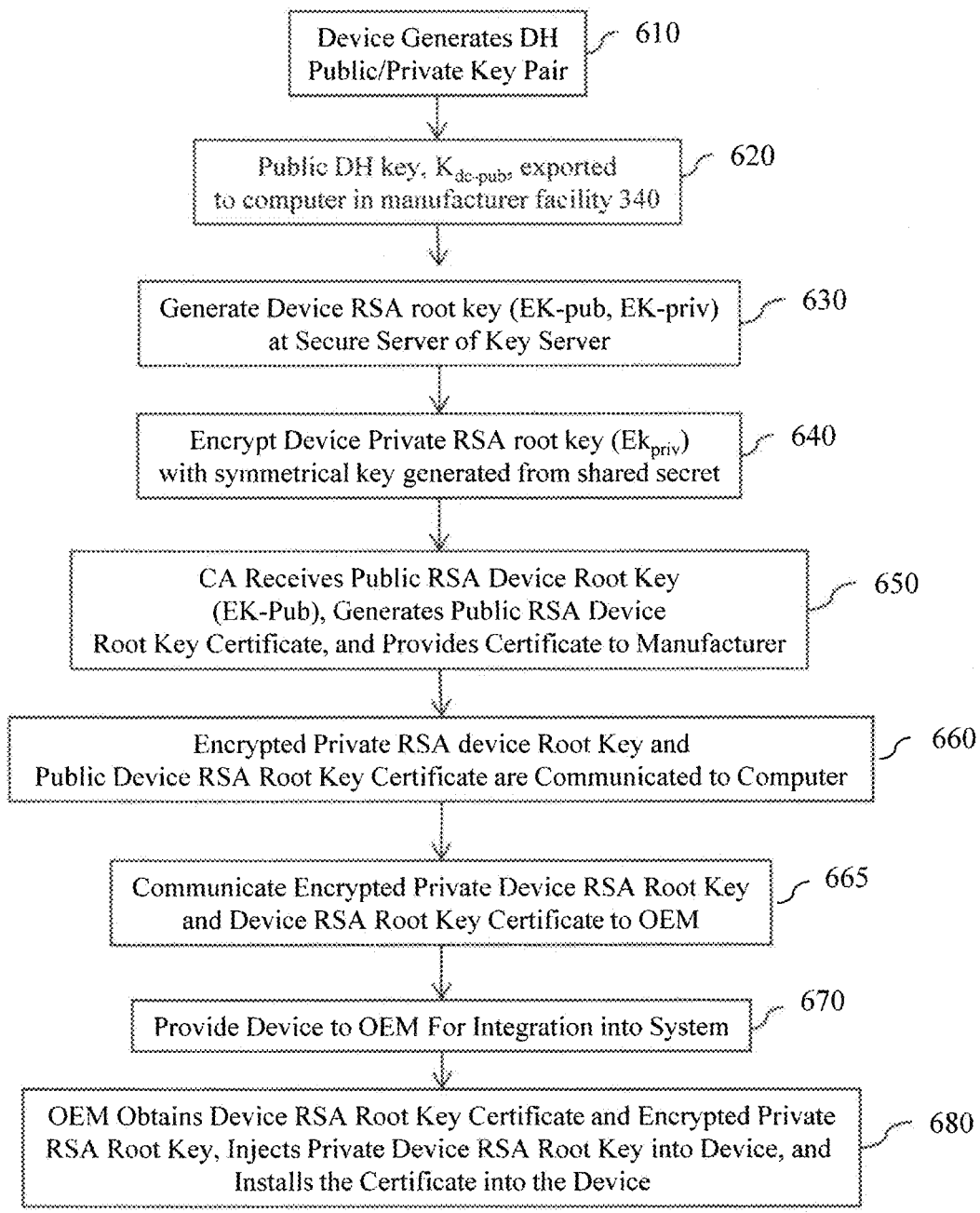
FIG. 6 depicts a flowchart of a method for manufacturer injection of device root keys, according to embodiments of the present invention.

The embodiments described in FIGS. 5 and 6 relate to the external generation of RSA device keys and the injection of the generated keys into the devices. Security between the key injection equipment and the device is critical. In these key injection embodiments, secure communication may be established between the key injection equipment and the device that is receiving the key. Additionally, in these embodiments, mutual authentication of the key injection equipment and the device may be provided. For example, the key injection equipment may authenticate the devices as genuine devices so that RSA keys are guaranteed to be injected into the intended devices. The devices may also be able to authenticate the key injection equipment so that they can be assured to be receiving RSA device keys from a trusted source. Finally, the key injection equipment should be sufficiently protected in a secure environment with proper access control (physical and logical) of the operators.

FIG. 5 depicts a flowchart 500 of a method for, injection of device root keys into the device by the OEM, according to embodiments of the present invention. FIG. 5 is described with reference to the exemplary operating environment of FIG. 3. However, FIG. 5 is not limited to that embodiment. In the embodiment of FIG. 5, the RSA root key for the device is generated externally by a secure server hosted by the OEM.

In step 510, a device 310 generates key material (e.g., public/private key pairs) using an algorithm such as Diffie Hellman (DH), elliptical curve DH (ECDH), DSA, elliptical curve DSA (ECDSA) or similar. The device key material may be stored within memory of device 310.

In step 520, a shared secret is established, for example, using Diffie Hellman key exchange between the device 310 and the server.

In step 530, a device 310 is provided to an OEM. for integration into a computer system 300.

In step 540. an RSA device root key (EK-pub, EK-priv) is generated for the device by the secure server of the OEM.

In step 550, the secure server encrypts the generated private RSA device root key (EK-priv) with a symmetrical key generated using the shared secret.

In step 560, the encrypted private RSA device root key is injected into device 310. As described above, prior to step 560, the key injection equipment of the OEM may authenticate the device as a genuine device before providing the RSA device key. Additionally, the device may include the capability to authenticate the key injection equipment, Through encryption, the RSA private key is protected by the shared secret. Therefore, the encrypted RSA private key may be stored in a memory external. to the security module of the device. After the encrypted private RSA device. is injected into device, the secure server deletes the RSA key from the secure server.

In step 570, the public RSA device root key is communicated to certificate authority 360 in a certificate signing request. The OEM may also communicate identification of the device manufacturer to the CA.

In step 580, the certificate authority 360 generates a device public RSA root key certificate including the public device RSA root key and a signature of the certificate authority. The CA then provides the certificate to the secure server of the OEM.

In step 590, the public device RSA root key certificate is provided to the OEM which in turn provides the public device RSA root key certificate to the system 300 integrating the device.

FIG. 6 depicts a flowchart 600 of a method for manufacturer injection of device root keys, according to embodiments of the present invention. FIG. 6 is described with reference to the exemplary operating environment of FIG. 3. However, FIG. 6 is not limited to that embodiment. In the embodiment of FIG. 6, the RSA key is generated by a secure server hosted by the manufacturer.

In step 610, device 310 key material (e.g., public/private key pairs) using an algorithm such as Diffie Hellman (DH), elliptical curve DH (ECDH), DSA, elliptical curve DSA (ECDSA) or similar. The device key material may be stored within memory of device 310.

In step 620, a shared secret is established, for example, using Diffie Hellman key exchange between the device 310 and the server.

In step 630, a device RSA root key (EK-pub, EK-priv) is generated by the secure server at the key server facility. Note that the secure server of the device manufacturer may generate RSA keys prior to device manufacture. The secure server can then assign a generated RSA device key to a device.

In step 640, the private RSA device root key, EK-priv, is encrypted with a symmetrical key generated from the shared secret.

In step 650, certificate authority 360 receives the public RSA device root key, EK-pub, in a certificate signing request. The CA then generates a device certificate including the public RSA device root key, and provides the certificate to the manufacturer key server. As described above, the certificate is digitally signed by the certificate authority 360.

In an alternate embodiment, the CA is provided with a set of generated RSA keys. In this embodiment, certificates could be generated for each RSA key in the set and provided in a batch to the secure server.

In step 660, the encrypted private RSA device root key and the public device RSA root key certificate are communicated to a computer 345 at the manufacturer facility. After communicating the encrypted private RSA device root key to the computer 345, the secure server of the manufacture deletes the private RSA device root key.

In step 665, the encrypted private device RSA root key and the device RSA root key certificate are communicated to the OEM. In embodiments, the manufacturer and OEM establish secure communications prior to communicating the key and certificate information. As would be appreciated by a person of skill in the art, the communication may be encrypted according to a known protocol such as SSL, TLS, or IPSec, Note that in an alternate embodiment, the encrypted device RSA root key and the device RSA root key certificate may be communicated by the secure server (key server 350) of the device manufacturer instead of computer 345.

In step 670, a device 310 is provided to an OEM for integration into a system 300.

In step 680, the OEM obtains the device RSA root key certificate and the encrypted private device RSA root key for the device. The OEM then injects the private device RSA root key into the device and installs the certificate.

As described above, prior to step 680, the key injection equipment of the OEM may authenticate the device as a genuine device before providing the RSA device key. Additionally, the device may include the capability to authenticate the key injection equipment.

Figure 7:
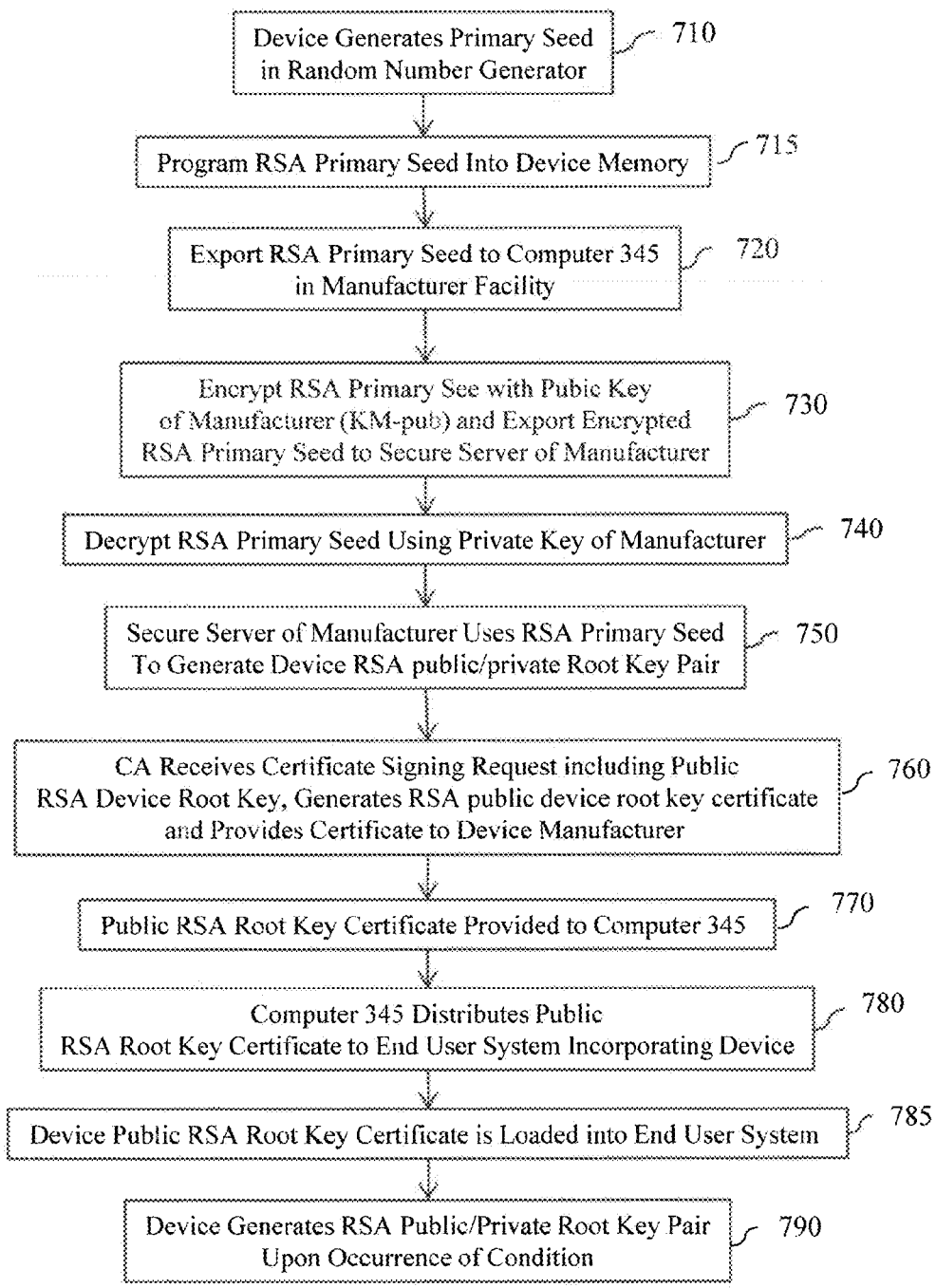
FIG. 7 depicts a flowchart of a method for seed-based in-field derivation of RSA device keys, according to embodiments of the present invention.

FIG. 7 depicts a flowchart 700 of a method for seed-based in-field derivation of RSA device keys, according to embodiments of the present invention. FIG. 7 is described with reference to the exemplary operating environment of FIG. 3. However, FIG. 7 is not limited to that embodiment. The method of FIG. 7 minimizes the cost impacts to the device manufacture process and is less vulnerable to security risks. Furthermore, the method of FIG. 7 is scalable.

In the embodiment of FIG. 7, the device generates its RSA key in the field after it has been integrated into the target system. The latency of RSA key generation can be more tolerated in the field because it is typically an interactive process that involves an end user. Also, because this embodiment generates the RSA key in a system, storage constraints are typically eliminated because of the presence of an associated memory in the target system (e.g., a flash drive).

In step 710, a primary seed is generated by device 310 using an on-chip random number generator 226. This primary seed is programmed into the one time programmable non-volatile memory 222 of the device. For a 2048~bit RSA key, the size of primary seed needs to be larger than the security strength of the 2048-bit RSA key, which is 112-bit. For this reason, in embodiments, a 256-bit primary seed is selected. Because generating the primary seed does not require the selection of a prime number, step 710 can be accomplished with reasonable speed. Note that the DSA private kay may also be a 256 bit random number. By slightly modifying the DSA key (kdi) generation process, the generated random seed can be used as a common primary seed to derive both the RSA root key and the DSA key.

In step 715, the RSA primary seed is programmed into memory of the device. For example, the RSA primary seed may be stored in one time programmable non-volatile memory within the secure module. Thus, in this method, the primary seed is generated and stored on-chip when the device is manufactured.

In step 720, the RSA primary seed is exported to computer 345 in manufacturer facility 340. Computer 345 receives RSA primary seeds from a plurality of devices 310 manufactured at manufacturer facility 340. Note that this step is optional. If not present, the seed is exported to secure server of the device manufacturer.

In step 730, computer 345 encrypts the RSA primary seed with the public key of the manufacturer (KM-pub) and exports the encrypted RSA primary seed to a secure server within the manufacturer. The public key of the manufacturer may be an RSA public key, DSA public key, a DH public key, an EC DSA public key, or a EC DH public key. As would be appreciated by a person of skill in the art, other forms of a public manufacturer key can be used with the present invention. The corresponding private key is held by a secure server (e.g., a hardware security module) of the manufacturer. The private manufacturer private key will be typically physically and logically secured by the manufacturer from unauthorized access.

In step 740, a secure server within the manufacturer key server facility decrypts the RSA primary seed using the private key of the manufacturer.

In step 750, the secure server of the manufacturer uses the RSA primary seed to generate the RSA public/private root key pair. In this step, the primary seed is fed into the algorithm to derive the RSA root key. This step requires lengthy computation due to the requirement of prime number selection. The algorithm ensures than once the primary seed is fixed and unique, the derived RSA root key is also unique. After generation of the RSA key pair, the secure server deletes the private RSA key from the secure server.

In embodiments, after an RSA primary seed is generated and exported, a sequence number and name of the device root key may also be generated by the manufacturer. The sequence number and/or name may be generated by computer 345 and/or secure server of the manufacture. The sequence number can be unique to a device and programmed into the memory of the device. The RSA device root key name may be generated by cryptographically hashing multiple concatenated fields such as the device revision number, sequence number, and primary seed. As would be appreciated by persons of skill in the art, other techniques for generating a key name can be used in embodiments of the present invention. The sequence number, root key name, and generated RSA public key are stored in a database of the manufacturer.

In step 760, certificate authority (CA) 260 receives a certificate signing request from the manufacture including the public RSA device root key, EK-pub, from the secure server of the manufacture. The CA then generates a RSA public device root key certificate including the public RSA device root key and provides the RSA public device root key certificate to the manufacturer. The certificate signing request may also include the sequence number and root key name. It these are provided to CA 360, CA 360 includes this information into the issued certificate. As described above, the certificate is digitally signed by CA 360.

In step 770, the secure server of the manufacturer provides the public RSA root key certificate to computer 345.

In step 780, computer 345 distributes the public RSA root key certificate to the end user system 300 incorporating the device. Note that step 780 is optional. In embodiments, the secure server of the manufacture (or another platform of the manufacture) may perform the step of distributing the public RSA key certificate to the end user system 300 incorporating the device. Further note, that in embodiments, the device manufacturer may provide this information to the OEM which in turn provides the information to the end user system.

In step 785, the device public RSA root key certificate is loaded into the end user system 300 and verified. If verification is successful, operation proceeds to step 790. If verification is unsuccessful, end user system 300 notifies either the OEM or device manufacturer and requests a new certificate.

In step 790, device 310 in end user system 300 generates the RSA public/private root key pair upon occurrence of a condition. For example, the device RSA root key pair may be generated upon receipt of a request or command to generate an RSA root key. Alternatively, the device RSA root key may be generated upon initial boot up of the system or when the security module or secure processor is first accessed.

In this step, the stored primary seed is fed into the algorithm to derive the RSA root key. This step requires lengthy computation due to the requirement of prime number selection. Thus, it is performed in the field after the device is deployed. The algorithm ensures than once the primary seed is fixed and unique, the derived RSA root key is also unique. Furthermore, because this step is performed in-field, the RSA root key (entire root key or private RSA root key) can be cryptographically wrapped (e.g., encrypted) by the device and stored in an attached flash device transparently without any software intervention It will be appreciated that the above described embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); magnetic disk storage media; optical storage media; flash memory devices; electrical, optical, acoustical or other forms of propagated signals.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. An apparatus for secure key generation, comprising:
    a device having a secure module, wherein the secure module includes:
        a random number generator configured to generate a primary seed,
        a non-volatile memory configured to store the generated primary seed, and
        a processor configured to generate a device root key including a public device root key and a private device root key from the primary seed upon occurrence of a condition within the apparatus; and
    a memory coupled to the device,
    wherein the device is configured to export the generated primary seed to a manufacturer server and to receive a certificate for the public device root key.

2. The apparatus of claim 1, wherein the processor of the secure module is further configured to encrypt the device root key using a second device key.

3. The apparatus of claim 2, wherein the memory is configured to store the encrypted device root key.

4. The apparatus of claim 1, wherein the processor of the secure module is further configured to encrypt the private device root key using a second device key.

5. The apparatus of claim 4, wherein the memory is configured to store the encrypted private device root key.

6. The apparatus of claim 1, further comprising:
    an interface for receiving the certificate for the public device root key, wherein the certificate includes the public device root key and a signature of a certificate authority that issued the certificate.

7. The apparatus of claim 6, wherein the memory is further configured to store the certificate for the public device root key.

8. The apparatus of claim 1, wherein the condition is a command requesting generation of a key.

9. The apparatus of claim 1, wherein the condition is initial boot up of the apparatus.

10. The apparatus of claim 1, wherein the condition is an initial access of the secure module.

11. The apparatus of claim 1, wherein the device root key is an RSA device root key.

12. A method for secure key generation with an end-user apparatus including a device having a secure module and a memory, the method comprising:
- generating a primary seed in the secure module of the device;
- exporting the primary seed from the device;
- receiving a certificate for a public device root key generated using the exported primary seed, wherein the certificate includes the public device root key and a digital signature of a certificate authority that issued the certificate;
- verifying the certificate;
- generating a private device root key using the generated primary seed stored in a memory within the secure module upon occurrence of a condition within the end-user apparatus; and
- storing the certificate and the private device root key in the memory of the end-user apparatus.

13. The method of claim 12, wherein the condition is a command requesting generation of a key.

14. The method of claim 12, wherein the condition is initial boot up of the end-user apparatus.

15. The method of claim 12, wherein the condition is an initial access of the secure module.

16. The method of claim 12, further comprising:
- providing the certificate to a second end-user apparatus to authenticate the device.

17. A method for secure key generation in a device manufacturer server, the method comprising:
- receiving a primary seed for a device, wherein the primary seed is encrypted with a manufacturer key;
- decrypting, at the device manufacturer server, the primary seed for the device;
- generating, in a secure module of the device manufacturer server, a public device root key and a private RSA root key for the device using the received primary seed for the device;
- requesting a certificate for the generated public device root key from a certificate authority;
- receiving the certificate for the generated public device root key from the certificate authority;
- providing the certificate to a system incorporating the device; and
- deleting the private RSA root key from the device manufacturer server.

18. The method of claim 17, further comprising associating the public device root key with a device root key name.

19. The method of claim 18, wherein the device root key name is generated using a sequence number for the device and the primary seed for the device.

20. The method of claim 19, wherein the sequence number is unique for he device within a lot of devices.

21. The method of claim 20, further comprising:
- storing the device root key name and the public device root key in a manufacturer database.

* * * * *

UNITED STATES PATENT AND TRADEMARK OFFICE
CERTIFICATE OF CORRECTION

| | |
|---|---|
| PATENT NO. | : 8,953,790 B2 |
| APPLICATION NO. | : 13/523801 |
| DATED | : February 10, 2015 |
| INVENTOR(S) | : Qi et al. |

It is certified that error appears in the above-identified patent and that said Letters Patent is hereby corrected as shown below:

In the Claims,

Column 12, line 26, please replace "is unique for he device" with --is unique for the device--.

Signed and Sealed this
Eighth Day of September, 2015

Michelle K. Lee
*Director of the United States Patent and Trademark Office*